United States Patent Office 2,984,996
Patented May 23, 1961

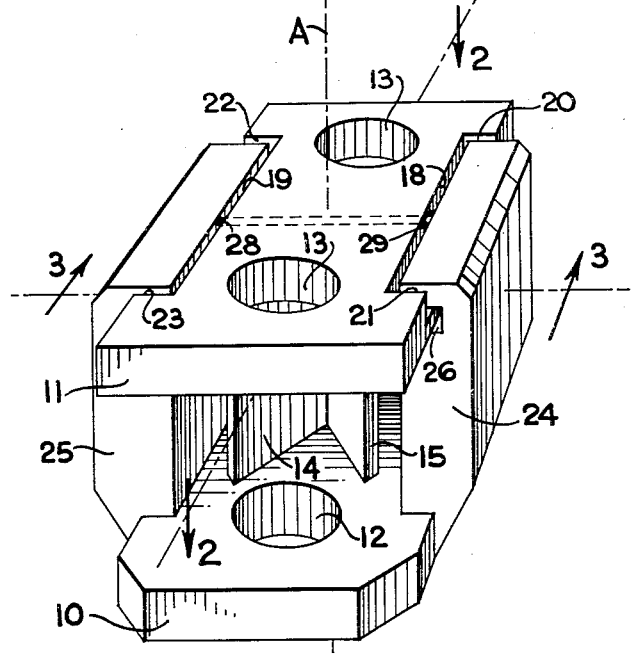
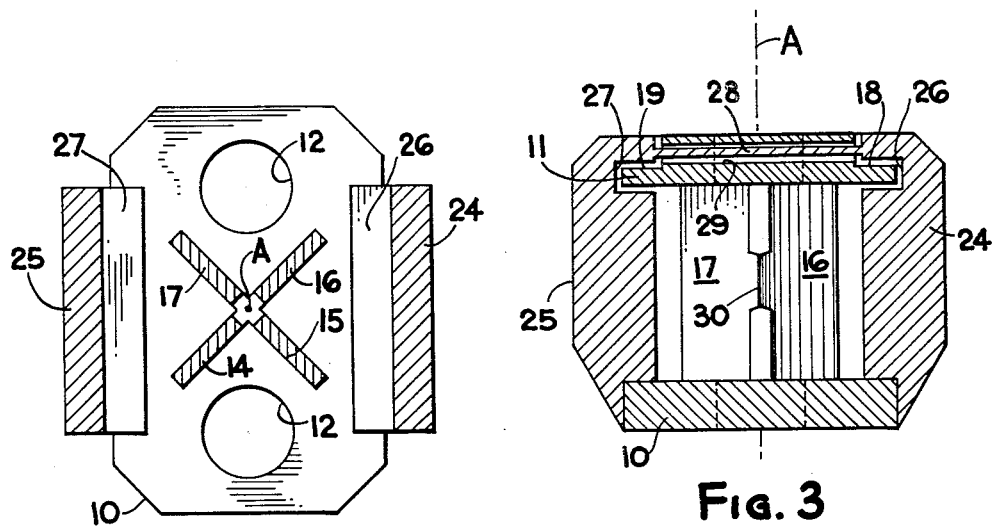
INVENTOR.
ALFRED N. ORMOND
BY
Elliott & Pastoriza
ATTORNEYS

2,984,996
ROLL FLEXURE UNIT
Alfred N. Ormond, 9107 5th Ave., Inglewood, Calif.
Filed Dec. 21, 1959, Ser. No. 860,919
6 Claims. (Cl. 64—15)

This invention relates generally to flexures and more particularly to an improved roll flexure unit for connection to members between which relative rotational movement takes place.

Various different types of flexure units as a substitute for pivots, hinges, or even universal joints are now well known in the art. The use of a flexure connection avoids friction, backlash, wear, and many other variables associated with more conventional types of couplings.

The principles of flexures are not difficult to apply in laboratory measurements. On the other hand, in attempting to employ flexures in relatively large installations or mounting structures, the required increased strength in the units necessitates unique design features. As a specific example, in the testing of a missile, the flexure joints mounting the same are subject to very large forces and further each of the forces are of different types so that a bending or pivot flexure must be designed to withstand axial compression and tension loads as well as shear or side loads and still perform its primary function of a pivot. Similarly, flexures operating in torque or twist as are employed for measuring roll characteristics must be able to withstand large compression, tension and shear and normal bending forces.

In the case of roll flexure units with which the present invention is concerned, increasing the dimension of the flexure portion of the unit to enable it to withstand large axial loads, results in a corresponding increase in the stiffness of the flexure thus limiting its usability. For example, a simple torsion rod can be employed as a roll flexure unit and is capable of accommodating large tension or compression axial loads. On the other hand, torsion rods or equivalent devices are very stiff with respect to their torsional flexing characteristics if they are to be kept within workable lengths resulting in relatively small displacements for large input torques. Moreover, the rod structures, while accommodating axial loads, are vulnerable to side or shear loading.

With the foregoing in mind, it is a primary object of the present invention to provide a greatly improved roll flexure unit capable of withstanding large axial compression and tension forces yet permitting relatively large displacements for normal input torques to the end that greatly increased accuracy in roll measurements can be achieved.

More particularly, it is an object to provide a novel roll flexure unit which is relatively compact in structure as compared to conventional torsion rods and yet can support high axial, shear, and normal bending loads while operating under relatively small input torques.

Still another object of the invention is to provide a roll flexure unit meeting the foregoing objects including a stop structure which will limit the axial and rotational displacement of the unit to given values above those at which the flexure portion of the device would fail to the end that the unit is protected against unexpected overtorquing or axial loading beyond that for which it was designed.

Briefly these and many other objects and advantages of this invention are attained by providing a pair of plates in generally spaced parallel relationship for securement respectively to members between which relative rotational movement about an axis passing normally through the plates takes place. A plurality of flexure webs are connected between the opposing faces of the plates, the planes of the webs being normal to the planes of the plates and all intersecting each other at the axis of rotation between the plates. By this arrangement, the desired degree of relative rotational movement can be readily accommodated by the respective flexure webs. At the same time, these webs are capable of withstanding large axial compression and tension forces. Moreover, because of the positioning of the webs they provide the necessary stability against shear or side forces.

Overstressing of the webs is prevented by suitable stop means in the form of arms extending from opposite edges of one of the plates towards the other. The free ends of the arms overlap the edge portions of the other plate in spaced relationship such that a change in the relative position between the plates beyond a contemplated amount results in engagement between free ends of the arms and the plate to prevent further displacement which could possibly damage the flexures.

A better understanding of the invention will be had by now referring to a preferred embodiment thereof as illustrated in the accompanying drawings in which:

Figure 1 is a schematic perspective view of the improved roll flexure unit of this invention;

Figure 2 is a view partly in cross section taken generally in the direction of the arrows 2—2 of Figure 1; and, Figure 3 is a cross section taken in the direction of the arrows 3—3 of Figure 1.

Referring to both Figures 1 and 2, the roll flexure unit comprises first and second plates 10 and 11 in spaced parallel relationship to each other. Each of the plates includes a means for securement to members between which rotational or roll motion takes place in the form of bolt receiving bores 12 for the plate 10 and 13 for the plate 11.

A plurality of flexure webs 14, 15, 16, and 17 are disposed between the opposing parallel faces of the plates 10 and 11 and the planes of these flexures are all normal to the plates and intersect at a common axis A which defines the roll axis of the unit. While four flexure webs have been shown successively circumferentially spaced about the axis A at 90 degrees to describe a cruciform structure, it should be understood that more flexure webs could be provided. Increasing the number of webs increases the axial loading which the unit can withstand. On the other hand, each time a web is added, the stiffness of the structure with respect to the desired rolling or torquing characteristics is increased. The minimum number of webs that could be feasibly employed are three spaced at 120 degrees to each other. Any number less than three would not provide the required degree of stability with respect to shear or side loading forces. With the use of four flexure webs however, as is the case in the preferred embodiment of applicant's invention, proper stability against side loads in any direction as well as the desired strength for axial compression and tension forces is achieved without unduly stiffening the structure with respect to its torque characteristics.

It is desirable to provide some type of stop means to limit the actual relative displacement between the plates 10 and 11 and thus prevent rupturing of the flexures should unanticipated loading occur. It is also desirable, however, to maintain a compact structure with minimum overall dimensions. Accordingly, the upper plate 11 is provided with recesses defining edge portions 18 and 19 along its opposite longitudinal edges of thickness less than the normal thickness of the plate. The ends of the recessed portions are indicated at 20, 21 for one longitudinal edge of the plate 11 and 22 and 23 for the other longitudinal edge. A pair of arm members 24 and 25 secured to corresponding opposite edges of the first plate 10 in turn extend towards the second plate 11 generally parallel to the axis A. The free ends of these arms include channels 26 and 27 as most clearly shown in Figure 3 for receiving the edge portions 18 and 19.

With particular reference to Figure 3, it will be noted that the thickness of the edge portions 18 and 19 is less than the width of the channels 26 and 27 so that engagement between the edge portions and the sides of the channel will only take place when the plates 10 and 11 are moved towards or away from each other beyond a given distance in the direction of the axis A. Similarly, the inward extent of the edge portions 18 and 19 into the channels is less than the depth of the channels thereby preventing any engagement between the edge portions and the bottom of the channel unless relative rotational displacement exceeds a given angle. The degree of rotation is also limited by the ends 20, 21, 22, and 23 abutting the sides of the arms.

Increased stability between the stop arms 24 and 25 is achieved by employing a connecting means 28 between the free ends of the arms passing through a transverse bore 29 in the plate 11. This means is normally free of engagement of the sidewalls of the bore by proper dimensioning so that it will not interfere with normal operation of the unit.

The operation of the roll flexure unit will be evident from the foregoing description. The plates 10 and 11 are initially secured to members between which rotational movement is to take place about a given axis co-inciding with the axis A of the unit. The bolt holes 12 and 13 are employed for this purpose. As mentioned, the lateral extent of the respective flexures themselves stabilize the plates 10 and 11 with respect to side forces. Moreover, the thickness of the flexures and their number distributed as shown in Figure 2 provide the required resistance to axial compression and tension forces. On the other hand, when the plates 10 and 11 are subject to relative rotational movement about the axis A each of the webs 14, 15, 16, and 17 will simultaneously be flexed or warped into a general S-shape configuration this warping occurring symmetrically at the upper and lower ends. Any rotational or torquing forces which would normally result in the plates moving beyond a given angle, is absorbed by the stop arms 24 and 25 as described. Similarly, unexpected axial forces are similarly checked by the arms.

By boring out a portion of the intersection of the flexures above and below their mid-points so that only the mid portions remain connected as indicated at 30 in Figure 3, the stiffness of the unit may be decreased. Removal of this material however will diminish slightly the axial loading which the unit can withstand. The extent of such boring can be varied depending upon the particular application of the flexure.

It will be evident from the foregoing that the entire structure is of a relatively compact design. By maintaining flat surfaces on the outer or exposed sides of the plates 10 and 11, a plurality of flexure units may be stacked so that a "series" connection is provided to enable a relatively large angular displacement without any increase in the stiffness. To this extent, the roll flexure units are modular and can be employed in combination with themselves or other types of flexure units to provide a desired result.

Modifications that fall clearly within the scope and spirit of this invention will occur to those skilled in the art. The roll flexure unit is thus not to be thought of as limited to the particular embodiment set forth merely for illustrative purposes.

What is claimed is:

1. A roll flexure comprising, in combination: first and second plates in spaced parallel relationship to each other, each of said plates including means for securement respectively to members between which relative rotational movement about an axis normal to said plates takes place; a plurality of flexure webs connected between said plates, the planes of said webs all being normal to the planes of said plates and intersecting each other at said axis; and stop means in the form of arm members secured to opposite edges of one of said plates on opposite sides of said axis and extending in the direction of said axis towards the other of said plates, the free ends of said arms overlapping in spaced relationship opposite edges of said other of said plates respectively, whereby movement of said plates with respect to each other in axial directions a given distance as measured therebetween results in said other of said plates engaging the overlapping free ends of said arms.

2. A roll flexure unit comprising, in combination: first and second plates having opposing surfaces in spaced parallel relationship to each other, each of said plates including means for securement respectively to members between which relative rotational movement about an axis normal to and passing centrally through said plates takes place; first, second, third, and fourth flexure webs lying in planes intersecting said axis and normal to said opposing surfaces, the opposite ends of said flexure webs being secured to said opposing surfaces respectively; means interconnecting said webs at a point on said axis mid-way between said opposing surfaces; arm members secured to opposite edges of one of said plates on opposite sides of said axis and extending in the direction of said axis towards the other of said plates, the free ends of said arms including opposing channels receiving opposite edges of said other of said plates, the thickness of the edge portions received in said channels being less than the width of said channels so that engagement between said edge portions and the sides of said channels only occurs when the relative spacing between said plates deviates more than a given distance, and the distance said edge portions extend into said channels being less than the depth of said channels so that engagement between said edge portions and the bottom of said channels only occurs when the relative rotational displacement between said plates with respect to said axis deviates more than a given angle.

3. The subject matter of claim 2, in which said other of said plates includes a bore passing therethrough and opening on opposite sides adjacent said channels; and means passing through said bore and connecting said free ends of said arms together, said means being in spaced relationship to the side walls of said bore.

4. The subject matter of claim 3, in which said webs are successively spaced at 90 degrees to each other as measured circumferentially about said axis at the intersection of their planes, to define a cruciform structure in cross-section.

5. A roll flexure unit comprising, in combination: first and second plates in spaced parallel relationship to each other, each of said plates including means for securement respectively to members between which relative rotational movement about an axis normal to said plates take place; and at least three flexure webs connected between said plates, the planes of said webs being normal to the planes of said plates and intersecting each other at said axis, portions of the intersecting edges of said webs at said axis being removed equally above and below a point in said axis midway between said plates to decrease the stiffness exhibited by said unit over that provided when said webs are connected throughout the length of said axis between said plates.

6. The subject matter of claim 5, including stop means connected to one of said plates and extending adjacent to the other of said plates in a position to engage the other of said plates when moved beyond a given distance with respect to the said one of said plates.

References Cited in the file of this patent

UNITED STATES PATENTS

| | | |
|---|---|---|
| 2,238,380 | Almen | Apr. 15, 1941 |
| 2,475,010 | Chilton | July 5, 1949 |
| 2,822,677 | Reynolds | Feb. 11, 1958 |